Jan. 25, 1927.
S. STONE
1,615,414
DRAINING HANDLE FOR STEW KETTLES
Filed July 23, 1926
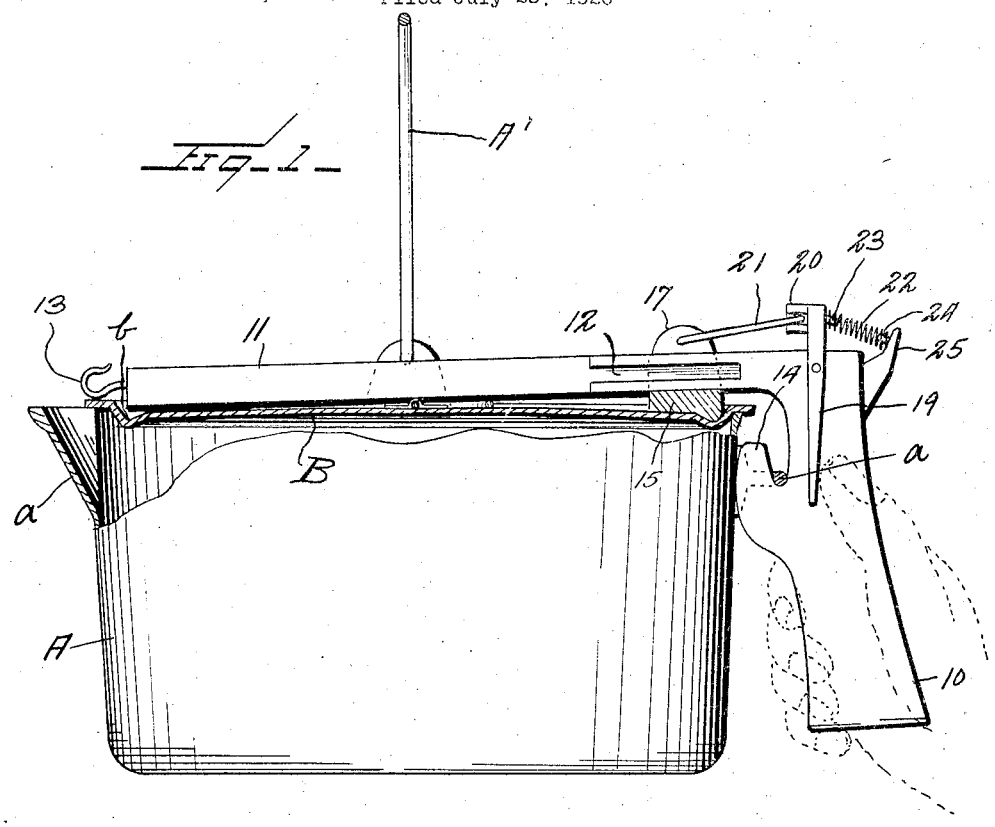
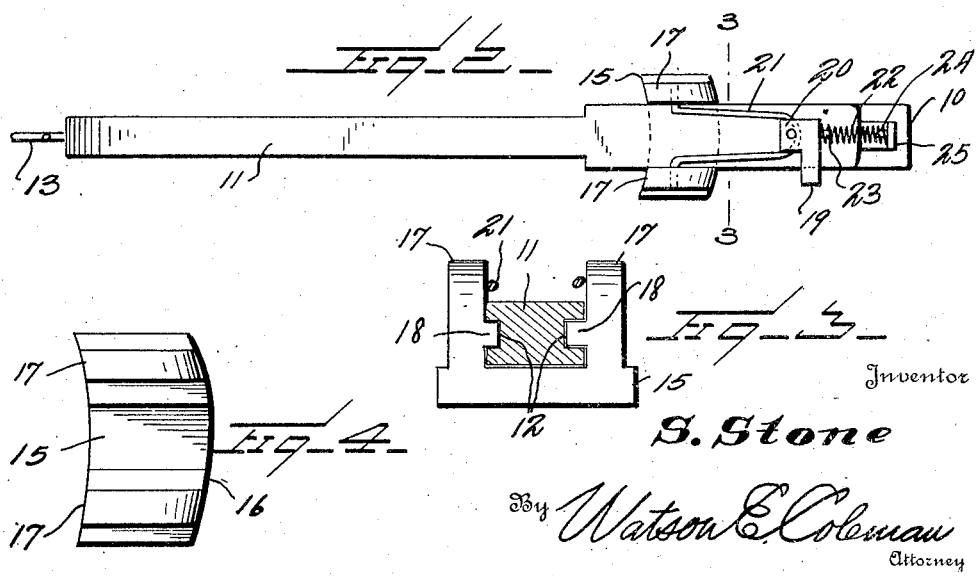
Inventor
S. Stone
By Watson E. Coleman
Attorney Patented Jan. 25, 1927.

1,615,414

UNITED STATES PATENT OFFICE.

SAMUEL STONE, OF MILES CITY, MONTANA.

DRAINING HANDLE FOR STEW KETTLES.

Application filed July 23, 1926. Serial No. 124,525.

This invention relates to devices for handling pots or kettles when it is desired to drain the liquid contents thereof without permitting solid materials within the kettle from being discharged. Ordinarily where potatoes or other vegetables are being stewed or boiled it is necessary to lift up the pot with one hand and with the other hold the pot lid in place, tipping the pot over to permit the hot water to drain off while retaining the potatoes or other vegetables. This is difficult to do as, not only is the pot lid and the kettle hot, but the steam from the draining water rises up around the hand in holding the pot lid in place.

The general object of my invention is to produce a device whereby the kettle and the pot lid may be handled to permit draining without any chance of burning the hand and without any discomfort.

Another object is to provide a device of this character which is very simple, which may be readily used and is thoroughly effective for the purpose intended.

My invention is illustrated in the accompanying drawings wherein:—

Figure 1 is an elevation of a kettle with the lid in section showing my draining handle applied thereto;

Fig. 2 is a top plan view of the draining handle;

Fig. 3 is a section on the line 3—3 of Figure 2;

Fig. 4 is a top plan view of the slide.

Referring to these drawings it will be seen that my device comprises a handle 10 from which extends a shank 11, this shank being disposed at an angle slightly greater than a right angle with relation to the handle. The shank adjacent the handle is provided with two laterally disposed grooves 12 and at the extremity remote from the handle has a hook 13 whereby the device may be suspended. The inner face of the handle is formed with an upwardly projecting lip 14 which has preferably a thickness of approximately from ⅜ths to ½", so that this lip 14 or upwardly projecting hook may be disposed between the handle $a$ of a pot A and the wall of the pot in the manner shown in Figure 1.

Slidingly mounted upon the shank and guided by the slots 12 is a clamping slide 15 having a rear edge, below the shank, which is convexly curved as at 16. This slide is formed with two upwardly extending ears 17 which loosely embrace the shank and these ears have inwardly projecting tongues 18 which engage in the grooves 12. The slide has an arcuate rib 15$^a$.

Pivoted upon the handle at its upper end is a lever 19 having a pair of forwardly projecting lugs 20 through which passes a pin and loosely engaged with this pin is a U-shaped link 21 whose ends are laterally bent and engage in the ears 17. A coiled compression spring 22 is engaged over a pin 23 projecting from the upper end of the lever and at its other extremity engaged over a pin 24 projecting from an upwardly projecting lug 25 attached to the handle.

In the use of this device, the operator first slides the lid B back so that the ridge $b$ bears against the wall of the pot. Then the operator takes the bail of the pot in the left hand and the draining handle 10 in the right hand and inserts the hook 14 between the kettle and the kettle handle $a$ and lifts up on the draining handle, pressing the trigger with the thumb and at the same time tipping the kettle. This drains the kettle but holds anything in it from the size of a pea upward. The member 15 bears against the wall of the annular depression $b$ and positively holds the pot lid retracted. The hook 13 may be used for lifting the lid of the kettle or for lifting the kettle itself by means of the bail.

I claim:—

1. A draining handle for pots comprising a handle proper and a shank extending approximately at right angles from the handle, the inner face of the handle below its junction with the shank being formed with an upwardly extending bill adapted to engage beneath the handle of a pot, and a member shiftably mounted on and carried by the shank adjacent its junction with the handle and extending below the shank and having an arcuately curved edge face adapted to engage a pot lid and hold the lid off center while the pot is being tipped and finger actuated means on the handle for shifting said member.

2. A draining handle for pots comprising a handle proper and a shank extending approximately at right angles from the handle, the inner face of the handle below its junction with the shank being formed with an upwardly extending bill adapted to engage beneath the handle of a pot, a sliding member mounted upon the shank adjacent its junction with the handle and extending below the shank and being formed with an arcuately curved rib adapted to engage in a pot lid bead, and means on the handle for shifting the sliding member along the shank toward the handle.

3. A draining handle for pots comprising a handle proper and a shank extending approximately at right angles from the handle, the inner face of the handle below its junction with the shank being formed with an upwardly extending bill adapted to engage beneath the handle of a pot, a sliding member mounted upon the shank adjacent its junction with the handle and extending below the shank and being formed with a convexly curved rear face and an arcuate rib being adapted to engage in a pot lid bead, and means on the handle for shifting the sliding member along the shank toward the handle, and a spring urging the sliding member away from the handle.

4. A draining handle for pots comprising a handle proper and a shank extending approximately at right angles from the handle, the inner face of the handle below its junction with the shank being formed with an upwardly extending bill adapted to engage beneath the handle of a pot, a sliding member mounted upon the shank adjacent its junction with the handle and extending below the shank and being formed with a convexly curved rear rib adapted to engage against a pot lid, a lever pivotally mounted upon the handle and having a link connection to said sliding member, the lever extending down along the side of the handle to permit it to be operated by a thumb, and a spring urging said lever and slide in a direction toward the opposite end of the shank.

5. A draining handle for pots comprising a handle proper and a shank extending approximately at right angles from the handle, the inner face of the handle below its junction with the shank being formed with an upwardly extending bill adapted to engage beneath the handle of a pot, a sliding member mounted upon the shank adjacent its junction with the handle and extending below the shank and being formed with a convexly curved rear face and with an arcuate rib adapted to engage with a pot lid, a lever pivotally mounted upon the handle and having a link connection to said sliding member, the lever extending down along the side of the handle to permit it to be operated by a thumb, and a spring urging said lever and slide in a direction toward the opposite end of the shank, the spring being at one end engaged with the lever and at the opposite end being engaged with a lug projecting from the handle.

In testimony whereof I hereunto affix my signature.

SAMUEL STONE.